United States Patent
Nam et al.

(10) Patent No.: US 11,798,457 B2
(45) Date of Patent: Oct. 24, 2023

(54) DISPLAY DEVICE

(71) Applicant: LG ELECTRONICS INC., Seoul (KR)

(72) Inventors: Yeonoh Nam, Seoul (KR); Seokpan Kang, Seoul (KR); Sangchurl Nam, Seoul (KR); Myongyoung Lee, Seoul (KR); Chungbin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/612,029

(22) PCT Filed: May 23, 2019

(86) PCT No.: PCT/KR2019/006161
§ 371 (c)(1),
(2) Date: Nov. 17, 2021

(87) PCT Pub. No.: WO2020/235722
PCT Pub. Date: Nov. 26, 2020

(65) Prior Publication Data
US 2022/0215792 A1 Jul. 7, 2022

(51) Int. Cl.
*G09G 3/20* (2006.01)

(52) U.S. Cl.
CPC ... *G09G 3/2092* (2013.01); *G09G 2320/0613* (2013.01); *G09G 2340/0407* (2013.01); *G09G 2354/00* (2013.01)

(58) Field of Classification Search
CPC ......... G09G 3/2092; G09G 2320/0613; G09G 2340/0407; G09G 2354/00; H04N 21/4394; H04N 21/8133; H04N 21/44029; H04N 21/4854; H04N 21/4825
See application file for complete search history.

(56) References Cited

U.S. PATENT DOCUMENTS

| 2010/0110300 A1 | 5/2010 | Ueno et al. |
| 2011/0029392 A1 | 2/2011 | Brown |

(Continued)

FOREIGN PATENT DOCUMENTS

| EP | 2495962 | 9/2012 |
| EP | 2916557 | 9/2015 |

(Continued)

OTHER PUBLICATIONS

PCT International Application No. PCT/KR2019/006161, International Search Report dated Feb. 21, 2020, 4 pages.

(Continued)

*Primary Examiner* — Yi Wang
(74) *Attorney, Agent, or Firm* — LEE, HONG, DEGERMAN, KANG & WAIMEY PC

(57) ABSTRACT

The present invention relates to a display device which changes the quality of displayed images in real time according to the genres of the images, the display device comprising: a storage unit which stores picture quality according to the genres of images; a display unit which displays an image corresponding to an input image signal; and a control unit which acquires the genre of an image and changes the quality of the image to the picture quality corresponding to the genre.

7 Claims, 9 Drawing Sheets

(56) References Cited

U.S. PATENT DOCUMENTS

| | | | | |
|---|---|---|---|---|
| 2012/0206493 | A1* | 8/2012 | Koike | H04N 21/431 |
| | | | | 345/660 |
| 2015/0256891 | A1* | 9/2015 | Kim | H04N 5/602 |
| | | | | 725/39 |
| 2015/0325019 | A1* | 11/2015 | Sukeno | H04N 21/440263 |
| | | | | 345/634 |
| 2016/0301976 | A1 | 10/2016 | Seo et al. | |
| 2020/0304883 | A1* | 9/2020 | Choi | H04N 21/44231 |

FOREIGN PATENT DOCUMENTS

| | | | | |
|---|---|---|---|---|
| JP | 2006245745 | | 9/2006 | |
| JP | 2012-129847 | | 7/2012 | |
| KR | 10-2011-0008781 | | 1/2011 | |
| KR | 10-2014-0053927 | | 5/2014 | |
| KR | 10-2015-0104347 | | 9/2015 | |
| KR | 10-2017-0119214 | | 10/2017 | |
| KR | 10-2019-0051219 | | 5/2019 | |
| KR | 10-1999607 | | 7/2019 | |
| WO | 2019054791 | | 3/2019 | |
| WO | WO-2020108474 A1 * | | 6/2020 | G06K 9/6268 |

OTHER PUBLICATIONS

PCT International Application No. PCT/KR2020/002836, International Search Report dated Nov. 13, 2020, 4 pages.
European Patent Office Application Serial No. 19929580.9, Extended European Search Report dated Nov. 15, 2022, 10 pages.

* cited by examiner

DISPLAY DEVICE

CROSS-REFERENCE TO RELATED APPLICATIONS

This application is the National Stage filing under 35 U.S.C. 371 of International Application No. PCT/KR2019/006161, filed on May 23, 2019, the contents of which are all hereby incorporated by reference herein their entirety.

TECHNICAL FIELD

The present disclosure relates to a display device, and more particularly, to a display device for displaying an image with an optimal picture quality according to a genre.

BACKGROUND ART

The resolution of a display device indicates how many pixels each frame constituting a screen is composed of.

With the advancement of technology, the resolution is continuously increasing, and the higher the resolution, the clearer the image can be expressed. However, as the number of pixels increases, the pixels are also composed of larger amount of data, so that more storage space and higher data processing speed are required.

Accordingly, the display device provides various image modes such that the screen is appropriately implemented according to the genre of images. For example, the display device provides a clear image mode for expressing a screen more clearly, a sports mode for vividly expressing fast movements, an eco mode for reducing power consumption, and the like. The display device may provide an appropriate picture quality to images by differently adjusting grayscale, color balance, color reproducibility, contrast, and the like according to an image mode.

On the other hand, there is a problem in that a user cannot switch image modes because he or she does not know the existence of the image modes, or the usability of the image modes is deteriorated due to the inconvenience of individually switching the image modes according to images.

DISCLOSURE

Technical Problem

An object of the present disclosure is to provide a display device capable of displaying images with an appropriate picture quality according to a genre of images that a user is watching.

Another object of the present disclosure is to provide a display device capable of minimizing a case where a user recognizes a change in picture quality when the picture quality is automatically changed according to images.

Still another object of the present disclosure is to provide a display device capable of minimizing an unnecessary change in picture quality.

Still another object of the present disclosure is to provide a display device capable of more accurately distinguishing genres of images.

Technical Solution

A display device according to an embodiment of the present disclosure may comprise a storage unit configured to store picture qualities for genres of images, a display unit configured to display an image corresponding to an input image signal, and a controller configured to acquire a genre of the image and change a picture quality of the image to a picture quality corresponding to the genre.

The controller of the display device according to an embodiment of the present disclosure may set the picture quality corresponding to the genre as a target picture quality, and control the display unit to change the picture quality of the image from a current picture quality to the target picture quality.

The controller of the display device according to an embodiment of the present disclosure may control the display unit such that the picture quality of the image is gradually changed for a set time.

The controller of the display device according to an embodiment of the present disclosure may fix the genre of the image during the set time.

The controller of the display device according to an embodiment of the present disclosure may increase the picture quality of the image when the target picture quality is higher than the current picture quality, and decrease the picture quality of the image when the target picture quality is lower than the current picture quality.

The controller of the display device according to an embodiment of the present disclosure may set a picture quality adjustment direction variable to a positive value when the target picture quality is higher than the current picture quality, and the picture quality adjustment direction variable to a negative value when the target picture quality is lower than the current picture quality.

The controller of the display device according to an embodiment of the present disclosure may acquire a picture quality adjustment step based on a set period of time for which the picture quality of the image is changed to the target picture quality.

The controller of the display device according to an embodiment of the present disclosure may control the display unit to change the picture quality of the image through a product of the picture quality adjustment step and the picture quality adjustment variable.

The controller of the display device according to an embodiment of the present disclosure may acquire the genre of the image at set periods.

The picture quality according to an embodiment of the present disclosure may include at least one of contrast, brightness, sharpness, color depth, and color temperature.

The controller of the display device according to an embodiment of the present disclosure acquire an EPG, an audio signal, and a video signal from the image signal, and acquire the genre of the image based on at least one of the EPG, the audio signal, and the video signal.

The controller of the display device according to an embodiment of the present disclosure may acquire the genre of the image based on the EPG when the genre of the image is detectable from the EPG, and acquire the genre of the image based on at least one of the audio signal and the video signal when the genre of the image is undetectable from the EPG.

The controller of the display device according to an embodiment of the present disclosure may calculate probabilities that the image corresponds to a plurality of genres, and recognize a genre corresponding to a maximum probability among the probabilities as the genre of the image.

The controller of the display device according to an embodiment of the present disclosure may maintain the genre of the image as current genre when the maximum probability is less than or equal to a reference probability.

The display device according to an embodiment of the present disclosure may further comprise a user input interface configured to receive an image mode selection command, wherein the controller is configured to control the display unit to change the picture quality of the image according to the genre of the image when the image mode is set to an auto mode according to the image mode selection command.

Advantageous Effects

According to the embodiments of the present disclosure, the picture quality is automatically changed according to genres of images, thereby providing the optimal picture quality for images the user is currently watching, and minimizing the inconvenience of the user having to manually change the picture quality according to the images.

In addition, when the picture quality is changed, the picture quality is gradually changed for a set time, thus minimizing interference with the user's image viewing due to the change in the picture quality.

In addition, it is possible to minimize unnecessary change in picture quality by minimizing the change in picture quality when a user continuously switches channels or when an advertisement is displayed in the middle of broadcasting.

In addition, it is possible to provide a picture quality suitable for the genre of images by more accurately discriminating the genres of images by using an EPG, an audio signal, and a video signal, thus improving the reliability of the product.

MODE FOR INVENTION

Hereinafter, embodiments relating to the present invention will be described in detail with reference to the accompanying drawings. The suffixes "unit" for components used in the description below are assigned or mixed in consideration of easiness in writing the specification and do not have distinctive meanings or roles by themselves.

Terms including ordinal numbers such as first and second may be used to describe various elements, but the elements are not limited by the terms. The terms are only used for the purpose of distinguishing one component from another component.

Figure 1:
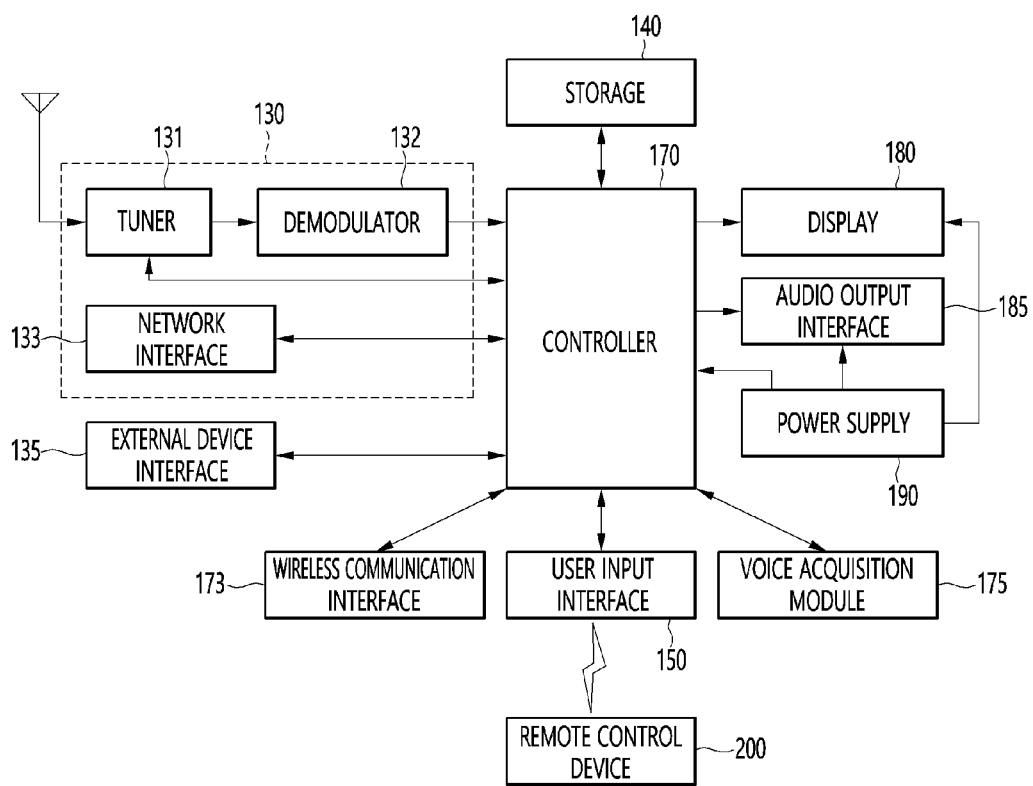
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a controller 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the controller 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage unit 140 can store signal-processed image, voice, or data signals stored by a program in order for each signal processing and control in the controller 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals inputted from local keys (not shown) such as a power key, a channel key, a volume key, and a setting key.

Image signals that are image-processed in the controller 170 can be inputted to the display unit 180 and displayed as an image corresponding to corresponding image signals. Additionally, image signals that are image-processed in the controller 170 can be inputted to an external output device through the external device interface unit 135.

Voice signals processed in the controller 170 can be outputted to the audio output unit 185. Additionally, voice signals processed in the controller 170 can be inputted to an external output device through the external device interface unit 135.

Besides that, the control module 170 can control overall operations in the display device 100.

Additionally, the controller 170 can control the display device 100 by a user command or internal program inputted through the user input interface unit 150 and download a desired application or application list into the display device 100 in access to network.

The controller 170 can output channel information selected by a user together with processed image or voice signals through the display unit 180 or the audio output unit 185.

Additionally, according to an external device image playback command received through the user input interface unit 150, the controller 170 can output image signals or voice signals of an external device such as a camera or a camcorder, which are inputted through the external device interface unit 135, through the display unit 180 or the audio output unit 185.

Moreover, the controller 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the controller 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
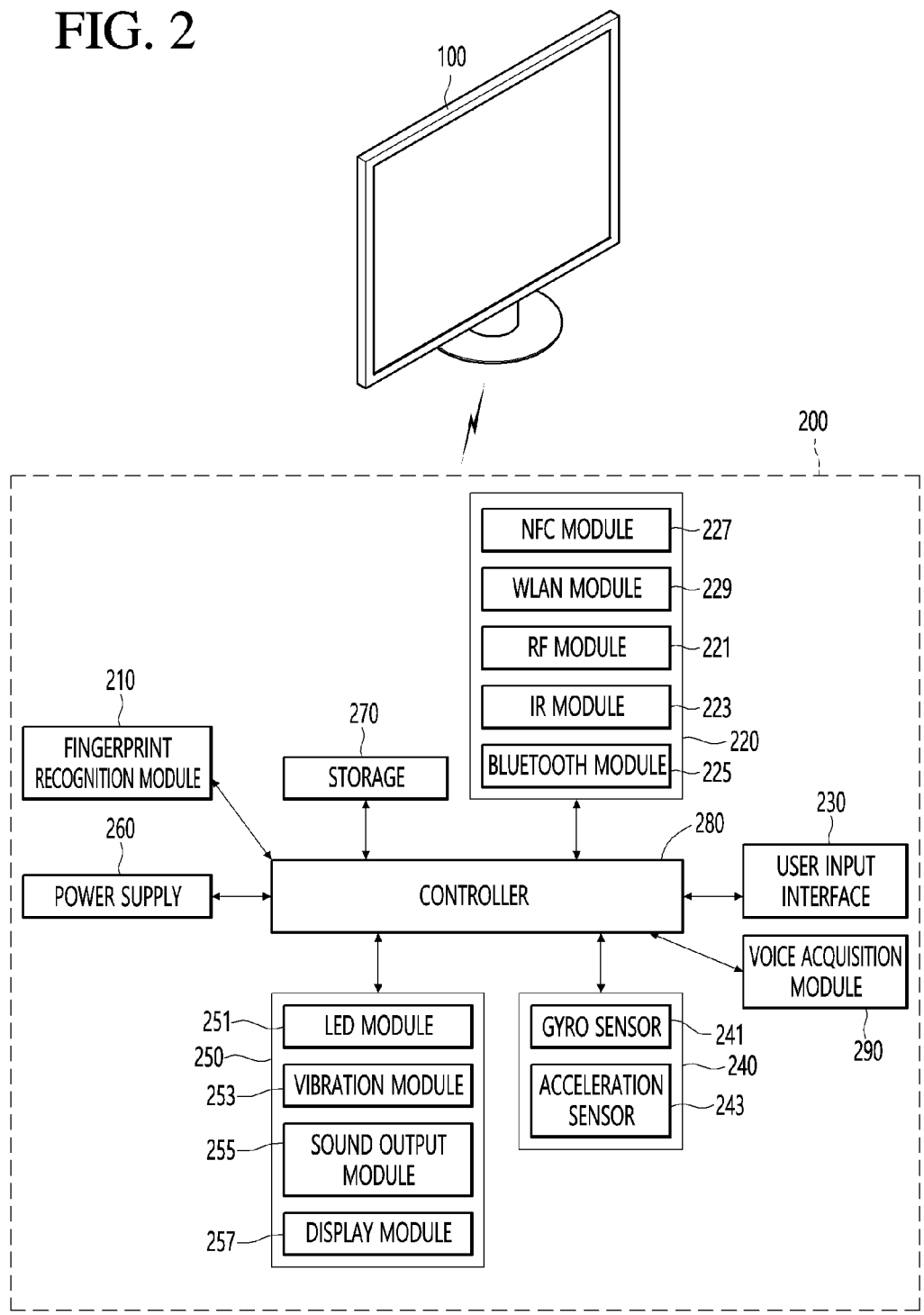
FIG. 2 is a block diagram illustrating a remote control device according to an embodiment of the present invention.
Figure 3:
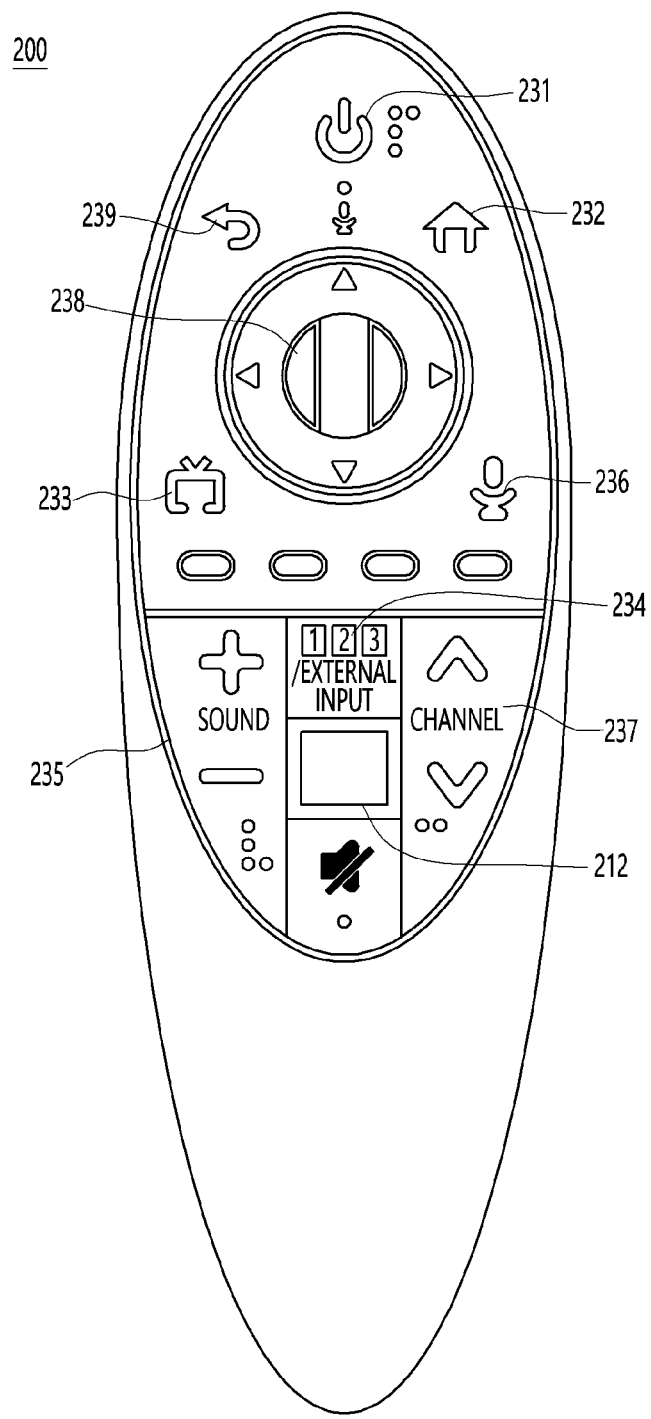
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
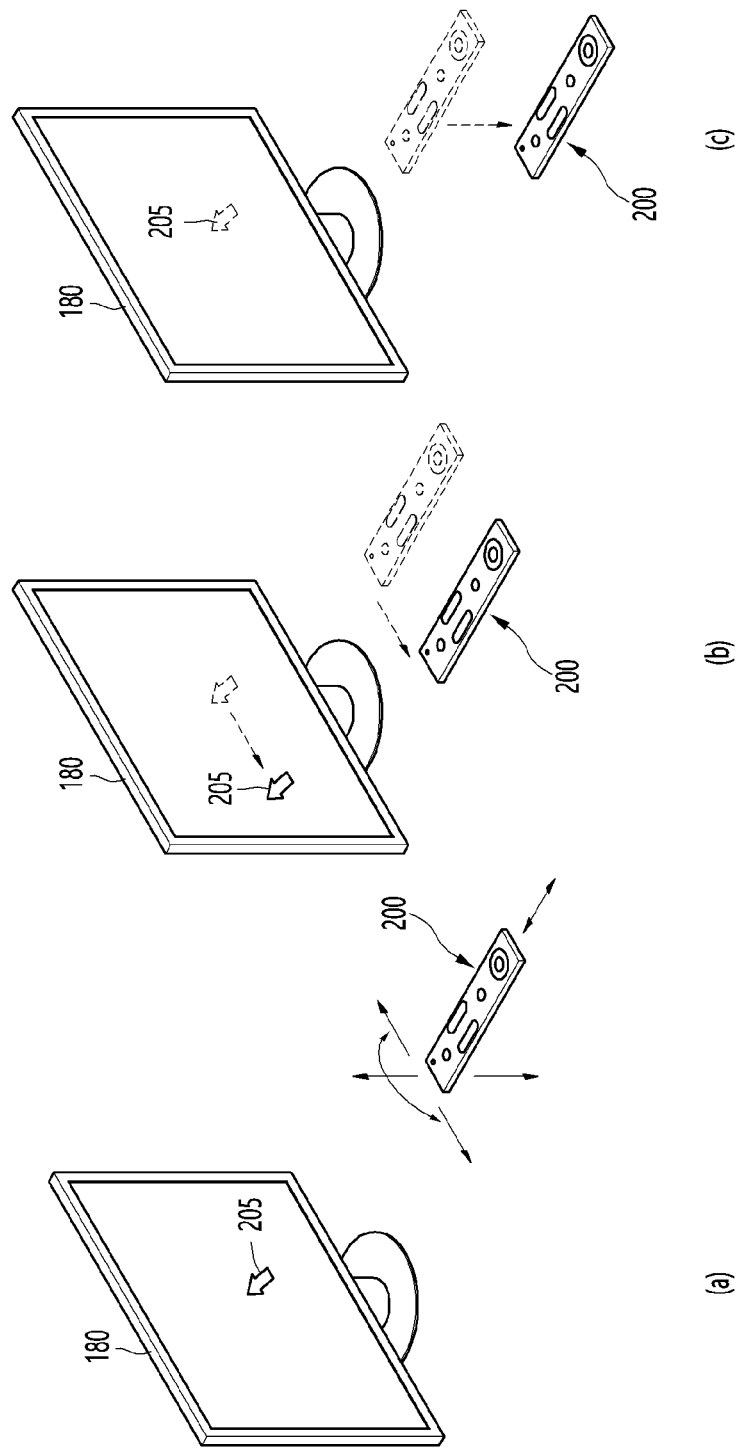
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
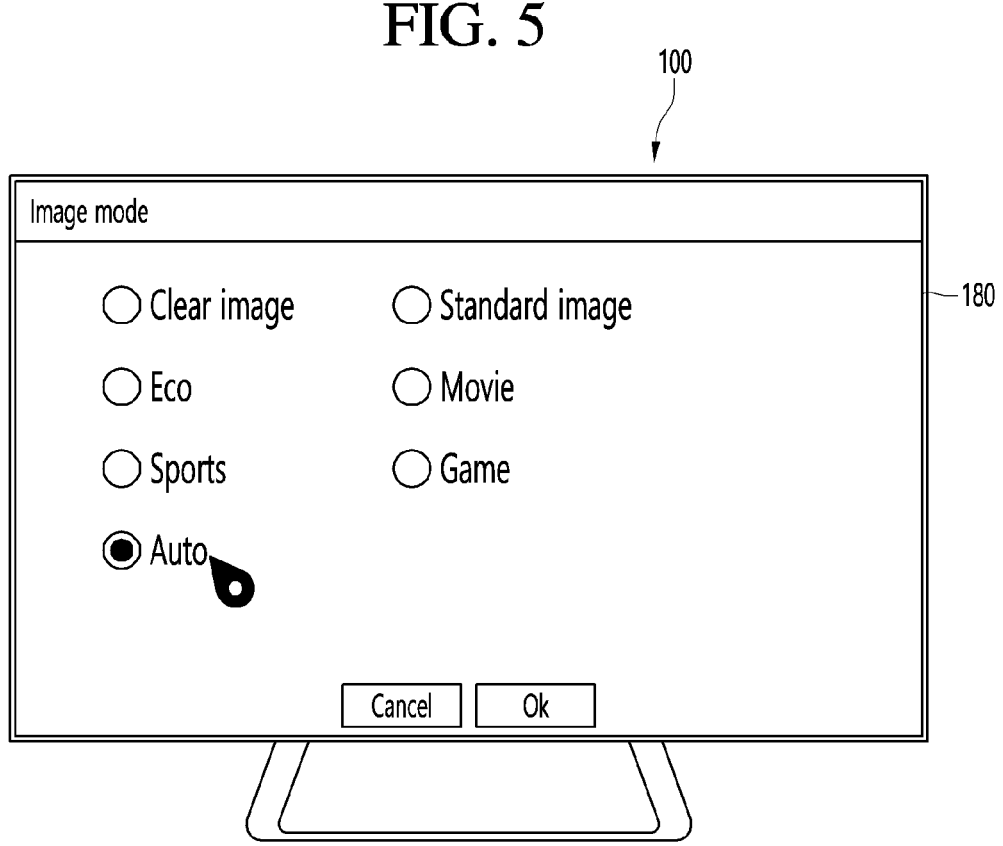
FIG. 5 is an exemplary diagram of a method for setting an image mode in a display device according to an embodiment of the present disclosure.

FIG. 5 is an exemplary diagram of a method for setting an image mode in a display device according to an embodiment of the present disclosure.

The controller 170 may control the display unit 180 such that the display unit 180 displays an image mode setting screen.

The image mode setting screen may be a screen for setting a picture quality of images being displayed by the display unit 180.

The image mode setting screen may include a plurality of image mode items. For example, as shown in FIG. 5, the video mode setting may include at least one of a 'clear image' mode, a 'standard image' mode, an 'eco' mode, a 'movie' mode, a 'sport' mode, a 'game' mode and an 'auto' mode.

The 'clear Image' mode is a mode for displaying a screen clearly by increasing the contrast, brightness, and sharpness of the screen, the 'standard Image' mode is a mode for displaying a screen with general contrast, brightness, and sharpness, the 'eco' code is a mode for adjusting a brightness of the screen to reduce power consumption, the 'movie' mode is a mode for displaying a screen optimized for a movie, the 'sport' mode is a mode for displaying a screen optimized for sports, in which a clear screen is implemented even in fast movement such as such as the case of kicking or throwing a ball, the 'game' mode is a mode for displaying on a screen optimized for the game, and the 'auto' mode is a mode in which picture quality is automatically changed according to an image.

Meanwhile, the image mode items shown in FIG. 5 are given as examples for convenience of description, and the number, types, and names of the image mode items may be different from those shown in FIG. 5.

A user may select an image mode to display a screen with a desired picture quality through the image mode setting screen.

The controller 170 may receive an image mode selection command through the user input interface unit 150.

The controller 170 may set an image mode by receiving a command to select any one of a plurality of image mode items.

In particular, when the image mode is set to the 'auto' mode through the image mode setting screen, the controller 170 may control the display unit 180 to automatically change a picture quality according to the genre of images.

That is, according to an embodiment, when the image mode is set to the 'auto' mode, the controller 170 may automatically change the picture quality according to the genre of images.

According to another embodiment, the controller 170 may automatically change the picture quality according to the genre of images without providing a separate image mode setting screen.

Figure 6:
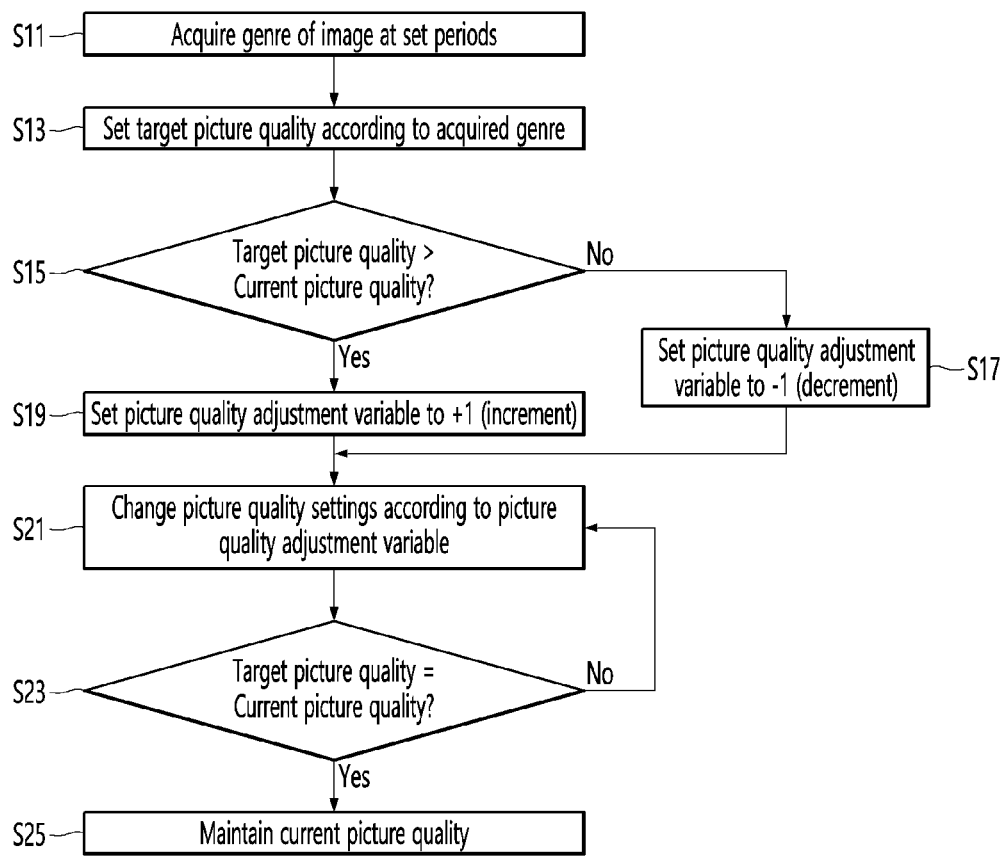
FIG. 6 is a flowchart illustrating a method for automatically changing a picture quality according to images in a display display according to an embodiment of the present disclosure.

FIG. 6 is a flowchart illustrating a method for automatically changing a picture quality according to images in a display display according to an embodiment of the present disclosure.

The controller 170 may acquire the genre of images at preset periods (S11).

The controller 170 may receive an image signal through the broadcast reception unit 130, the external device interface unit 135, the wireless communication unit 173, and the like, and control the display unit 180 to display an image corresponding to the input image signal.

The controller 170 may acquire the genre of an image being displayed by the display unit 180 at preset periods.

The genre of the image may mean the type of the image. For example, the type of image may include movies, sports, games, animation, photo, drama, entertainment, documentary, and the like. In this case, the controller 170 may acquire the genre of the image as any one of movies, sports, games, animation, photo, drama, entertainment, documentary, and the like.

The controller 170 may acquire an EPG, an audio signal, and a video signal from the input image signal, and acquire a genre of the image based on at least one of the EPG, the audio signal, and the video signal.

Figure 7:
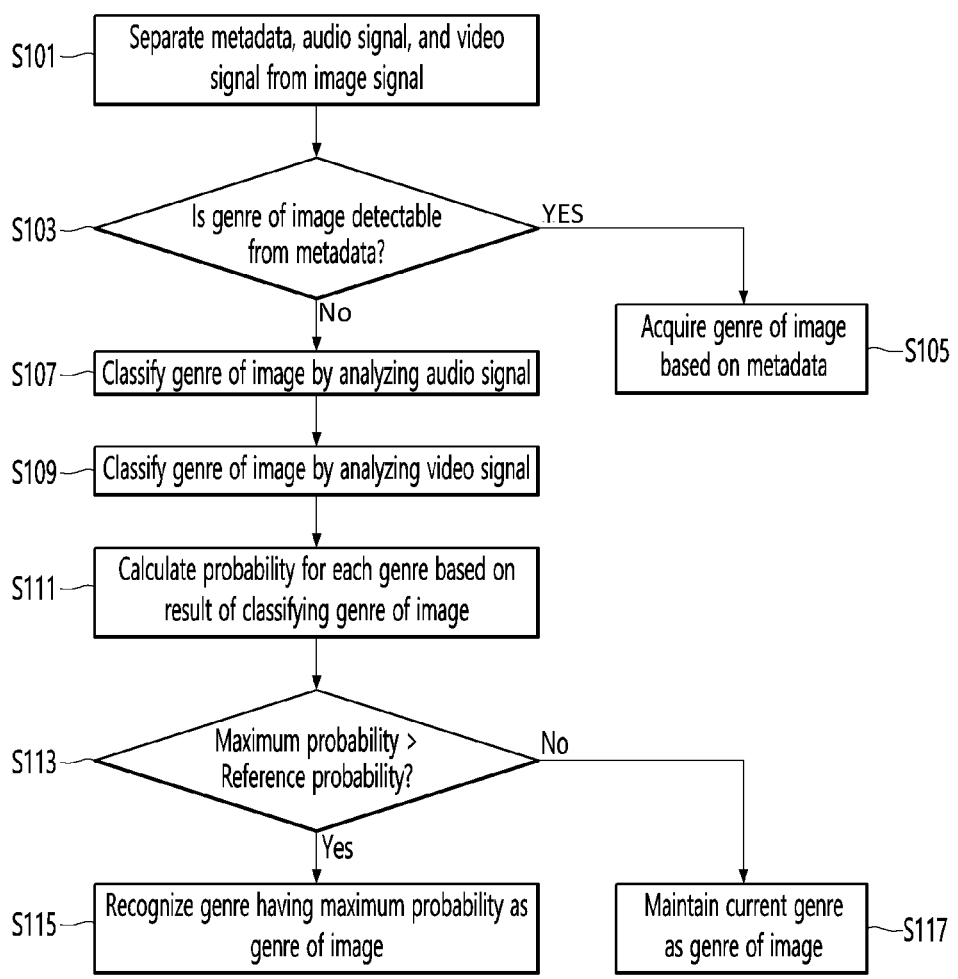
FIG. 7 is a flowchart illustrating a method for acquiring a genre of an image in a display device according to an embodiment of the present disclosure.

FIG. 7 is a flowchart illustrating a method for acquiring a genre of an image in a display device according to an embodiment of the present disclosure.

The controller 170 may separate metadata, the audio signal, and the video signal from an image signal (S101).

The image signal may include at least one of metadata, an audio signal, and a video signal.

Here, the meta data may refer to attribute information of an image signal, and may include an Electronic Program Guide (EPG). The EPG may include information such as a time, a title, a channel, and a genre of a broadcast program.

The audio signal is a signal in an audio range, and may be obtained by converting voice and all natural sounds in an audible frequency range into an electrical waveform signal.

The video signal is a signal for reporting the color, brightness, position, and the like of each pixel on the screen, and may be an electrical image signal obtained by converting a moving image taken by a camera or the like into an electrical waveform signal.

The controller 170 may separate the input image signal into the metadata, the audio signal, and the video signal using a decoder (not shown).

The controller 170 may determine whether the genre of the image is detectable from the metadata (S103).

When the EPG includes the genre of the image, the controller 170 may determine that the genre of the image is detectable from the metadata.

On the other hand, when the EPG does not include the genre of the image, the controller 170 may determine that the genre of the image is undetectable from the metadata.

When the genre of the image is detectable from the metadata, the controller 170 may acquire the genre of the image based on the metadata (S105).

Meanwhile, when the genre of the image undetectable from the metadata, the controller 170 may acquire the genre of the image based on at least one of the audio signal and the video signal.

Specifically, the controller 170 may analyze the audio signal to classify the type of image (S107), and analyze the video signal to classify the type of the image (S109).

Although it is illustrated that step S109 is performed after step S107 has been performed in FIG. 7, the order of steps S107 and S109 may be changed or steps S107 and S109 may be performed simultaneously.

The controller 170 may acquire the type of image based on the audio signal. For example, the controller 170 may classify the type of image into news, movie, music, standard, or the like based on the audio signal. Specifically, the controller 170 may classify the type of the image as news when a human voice of the audio signal is recognized as having a magnitude within a predetermined range for a certain period of time or longer, classify the type of the image as movies when a human voice, sound effect, and the like are mixed in the audio signal, classify the type of the image as music when the audio signal includes a melody, and classify the type of the image as standard when the audio signal does not belong to any one of news, movie, and music.

The controller 170 may analyze the type of the image based on the video signal. For example, the controller 170 may classify types of images into cartoons, movies, dramas, sports, and the like based on the video signal. Specifically, the controller 170 may classify the type of the image as a cartoon when the video signal contains more than the set standard of secondary color, classify the type of the image as a movie or a drama according to the resolution of the image when a human being is detected from the video signal, and classify the type of image as sports when movement of people in a certain place is detected from the video signal.

Figure 8:
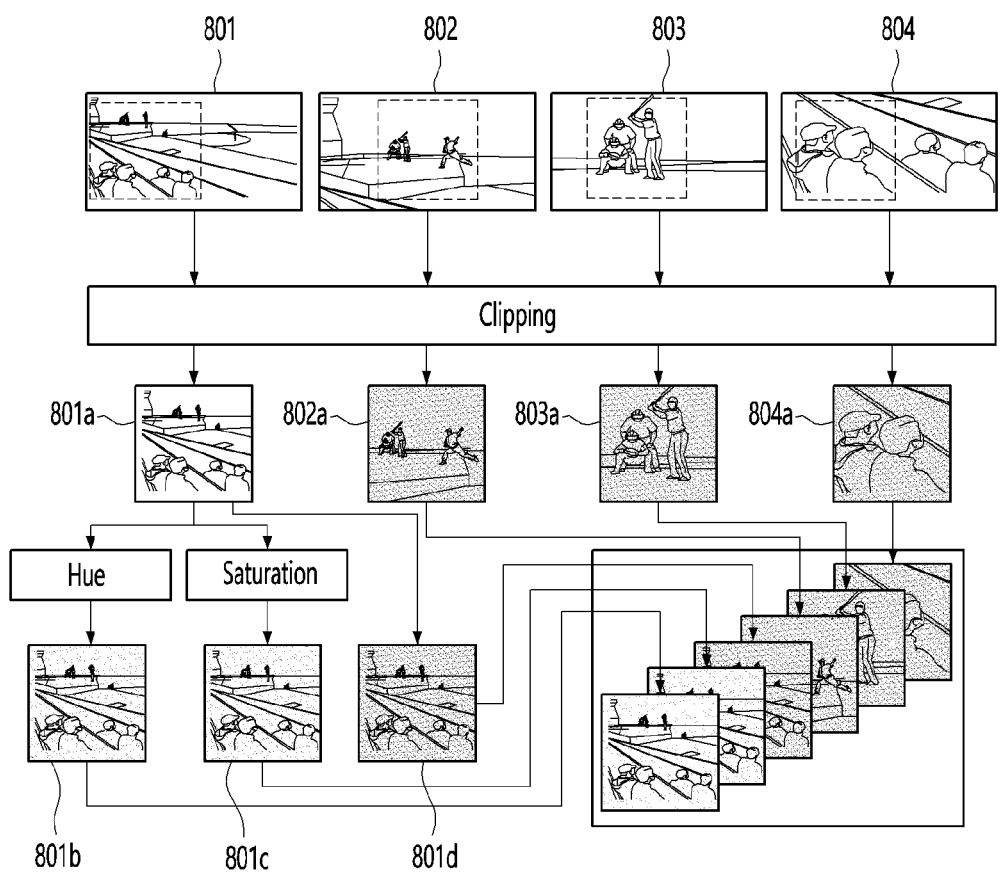
FIG. 8 is an exemplary diagram illustrating a method for analyzing a type of an image based on a video signal in a display device according to an embodiment of the present disclosure.

FIG. 8 is an exemplary diagram illustrating a method for analyzing a type of an image based on a video signal in a display device according to an embodiment of the present disclosure.

The minimum information for the controller 170 to classify the genre of an image based on the video signal may be brightness and hue information of the image.

Specifically, the controller 170 may acquire one frame for every n frames of the video signal. For example, the controller 170 may acquire an n-th frame image 801, a 2n-th frame image 802, a 3n-th frame image 803, a 4n-th frame image 804, and the like from the video signal.

The controller 170 may acquire first to fourth clipping images 801a, 802a, 803a, and 804a by cutting out only a partial region from a plurality of frame images 801 to 804, respectively. In this case, the first clipping image 801a may be an image converted into the YCbCr color space, and each of the second to fourth clipping images 802a, 803a, and 804a may be an image expressed only by "Y" (brightness component). After extracting only color difference information (Cb, Cr) from the first clipping image 801a, the controller 170 may acquire an image 801b expressed with hues and an image 801c expressed with saturation, and an image 801d expressed only with a brightness component Y. In addition, the type of the image may be analyzed based on the hue image 801b, the saturation image 801c, and the brightness image 801d extracted from the first frame image 801, and the brightness images 802a, 803a, and 804a respectively extracted from the second to fourth frame images 802 to 804.

That is, after acquiring specific frame images from the image, the controller 170 may analyze the type of image based on changes in hue, saturation, and brightness of the frame images.

Meanwhile, the method of analyzing the type of image shown in FIG. 8 is merely exemplary, and the controller 170 may analyze the type of the image through various methods.

For example, the controller 170 may analyze the type of image in consideration of high-frequency components, motion components, a frequency of scene change, text information, and the like, in addition to the brightness and hue information of images.

Again, description will be given with reference to FIG. 7.

The controller 170 may calculate a probability for each genre based on the result of classifying the types of images (S111).

The controller 170 may calculate a probability that an image corresponds to each of a plurality of genres. For example, the controller 170 may classify the type of image as a movie as a result of analyzing the audio signal, and calculate the probability that the genre of the image is a movie as 18% and the probability that the genre of the image is sports as 20% when the type of image is classified as the movie and sports as the result of the analysis for the video signal.

According to an embodiment, the controller 170 may give a weight to any one of the audio signal and the video signal, and in this case, the probabilities for genres may be calculated differently.

That is, since the method of calculating a probability for each genre is merely exemplary, the method may be various.

The controller 170 may determine whether the maximum probability exceeds a reference probability (S113).

The maximum probability may mean a probability having the largest value among the calculated probabilities for genres.

The reference probability may be a predetermined probability to increase reliability of genre acquisition. For example, the reference probability may be 70%.

When the maximum probability is greater than the reference probability, the controller 170 may recognize the genre of the image as the genre having the maximum probability (S115), and when the maximum probability is less than or equal to the reference probability, maintain the genre of the image as a current genre (S117).

For example, when the probability that the image is a movie is 80% and the probability that the image is sports is 80% as the result of calculation of the probabilities for genres, the maximum probability of 80% is greater than the reference probability of 70%, and thus the controller 170 may recognize, as a genre, a movie corresponding to the maximum probability of 80%.

On the other hand, as another example, when the probability that the image is a movie is 50%, the probability that the image is drama is 25%, and the probability that the image is news is 25%, as the result of calculation of the probabilities for genres, the maximum probability of 50% is less than or equal to the reference probability of 70%, and thus the controller 170 may maintain, as a genre of the image, the current genre. That is, when the maximum probability is less than or equal to the reference probability, the controller 170 may continue to maintain the current genre of the image without changing the genre of the image. For example, when the current genre of the current is sports, the genre of the image may be maintained as sports.

As described with reference to FIG. 7, when the genre of the image is able to be detected through the EPG, the controller 170 may recognize a genre included in the EPG as the genre of the image. Since the EPG is provided by a broadcasting station, when a genre is included in the EPG, the genre recognition accuracy according to the EPG is higher than the genre recognition accuracy according to the audio signal or the video signal. Meanwhile, when the genre cannot be obtained from the EPG, the controller 170 may recognize the genre by extracting features from at least one of the audio signal and the video signal.

Meanwhile, according to an embodiment, the controller 170 may transmit at least one of the audio signal and the video signal to an external server (not shown), and in this case, the external server (not shown) may be a server capable of learning a method of classifying a genre according to an audio signal and a video signal based on a database. In this case, the controller 170 may receive the genre of an image from the external server (not shown).

As described above, the controller 170 may acquire the genre of the image in various methods.

Again, details will be described with reference to FIG. 6.

After acquiring the genre of the image, the controller 170 may set a target picture quality according to the acquired genre (S13).

The controller 170 may change the picture quality to a picture quality corresponding to the genre of the image.

Specifically, the storage unit 140 may store a picture quality for each of genres of images, and the picture quality may include at least one of contrast, brightness, sharpness, color depth, and color temperature. For example, the storage unit 140 may store picture quality information including a contrast of 95, a brightness of 50, a sharpness of 25, a color depth of 55, and a color temperature of 20 when the genre of the image is 'movie', picture quality information including a contrast of 100, a brightness of 50, a sharpness of 30, a color depth of 70, and a color temperature of 50 when the genre of the image is 'sports', picture quality information including a contrast of 80, a brightness of 70, a sharpness of 15, a color depth of 60, and a color temperature of 40 when the genre of the image is 'news', but the present disclosure is not limited thereto as they are merely examples.

The controller 170 may set the picture quality according to the acquired genre as a target picture quality. For example, when 'movie' is acquired as the genre of the image, the controller 170 may set the target picture quality to a contrast of 95, a brightness of 50, a sharpness of 25, a color depth of 55, and a color temperature of 20.

After setting the target picture quality, the controller 170 may control the display unit 180 to change the picture quality from the current picture quality to the target picture quality. The current picture quality may mean the picture quality of an image currently being displayed by the display unit 180. The controller 170 may increase the picture quality when the target picture quality is higher than the current picture quality, and may decrease the picture quality when the target picture quality is lower than the current picture quality.

Meanwhile, there may be various methods for the controller 170 to change the picture quality to the target picture quality.

According to an embodiment, the controller 170 may control the display unit 180 to immediately change the picture quality from the current picture quality to the target picture quality.

According to another embodiment, the controller 170 may control the display unit 180 such that the picture quality is gradually changed during a set time. Hereinafter, a method of gradually changing a picture quality of an image will be described.

The controller 170 may determine whether a target picture quality is greater than a current picture quality (S15).

The controller 170 may compare the target picture quality with the current picture quality to determine whether the target picture quality is higher than the current picture quality.

When the target picture quality is lower than the current picture quality, the controller 170 may set a picture quality adjustment variable to −1 (decrement) (S17), and when the target picture quality is higher than the current picture quality, set the picture quality adjustment variable to +1 (increment) (S19).

The picture quality adjustment variable may mean a picture quality adjustment direction. When the target picture quality is higher than the current picture quality, the controller 170 may set a picture quality adjustment direction variable to a positive value, and when the target picture quality is lower than the current picture quality, the picture quality adjustment direction variable to a negative value.

In the example of FIG. 6, it is assumed that the picture quality adjustment variable is set to +1 or −1, but this is only an example for convenience of description, and thus is not limited thereto. The controller 170 may increase a picture quality change rate of images by increasing the absolute value of the picture quality adjustment variable, and decrease the picture quality change rate of images by decreasing the absolute value of the picture quality adjustment variable. The controller 170 may receive the picture quality change rate of images through the user input interface unit 150, and in this case, may change the absolute value of the picture quality adjustment variable according to the picture quality change rate.

When the picture quality adjustment variable is a negative number, the picture quality may be changed to be lower, and when the picture quality adjustment variable is a positive number, the picture quality may be changed to be higher.

The controller 170 may set a picture quality adjustment variable for each of elements constituting the picture quality. For example, when a target picture quality includes a contrast of 95, a brightness of 50, a sharpness of 25, a color depth of 55, and a color temperature of 20, and the current picture quality includes a contrast of 80, a brightness of 70, a sharpness of 25, a color depth of 55, and a color temperature of 40, the controller 170 may set the quality adjustment variable of the contrast to +1, the quality adjustment variable of the brightness to −1, and the quality adjustment variable of the color temperature to −1.

The controller 170 may change picture quality settings according to the picture quality adjustment variable (S21).

The controller 170 may set a picture quality adjustment time, and may control the display unit 180 to change the picture quality in a stepwise manner from the current picture quality to the target picture quality during the picture quality adjustment time.

The picture quality adjustment time may be a time set to minimize the user's discomfort in viewing images due to a sudden change in picture quality. For example, the picture quality adjustment time may be 3 minutes, but is only an example and is not limited thereto.

The controller 170 may acquire a picture quality adjustment step by dividing a difference value between the target picture quality and the current picture quality by the picture quality adjustment time. For example, when the contrast corresponding to the target picture quality is 95 and the contrast corresponding to the current picture quality is 80, the controller 170 may perform an operation of dividing 15, which is the difference between the target picture quality and the current picture quality, by 3 minutes (i.e., 180 seconds), which is the picture quality adjustment time, to obtain a picture quality adjustment step of 0.08. Although only the contrast is given as an example, the controller 170 may obtain the picture quality adjustment step for each of the elements constituting the picture quality. The picture quality adjustment step may be different depending on the elements constituting the picture quality.

The controller 170 may control the display unit 180 to change the picture quality through the product of the picture quality adjustment step and the picture quality adjustment variable. That is, the controller 170 may control the display unit 180 to change the picture quality by a value obtained by multiplying the picture quality adjustment step of 0.08 by the picture quality adjustment variable +1 or −1 at a time. The display unit 180 may display an image of which the picture quality setting has been changed by a value obtained by multiplying the picture quality adjustment step of 0.08 by the picture quality adjustment variable +1 or −1 from the current picture quality.

The controller 170 may determine whether the current picture quality is identical to the target picture quality (S23).

When the current picture quality is not identical to the target picture quality, the controller 170 may change the picture quality settings according to the picture quality adjustment variable. That is, the controller 170 may change the picture quality settings of the display unit 180 until the current picture quality is identical to the target picture quality.

Meanwhile, when the current picture quality is identical to the target picture quality, the controller 170 may maintain the current picture quality (S25).

That is, when the current picture quality is identical to the target picture quality, the controller 170 may stop changing the picture quality.

Figure 9:
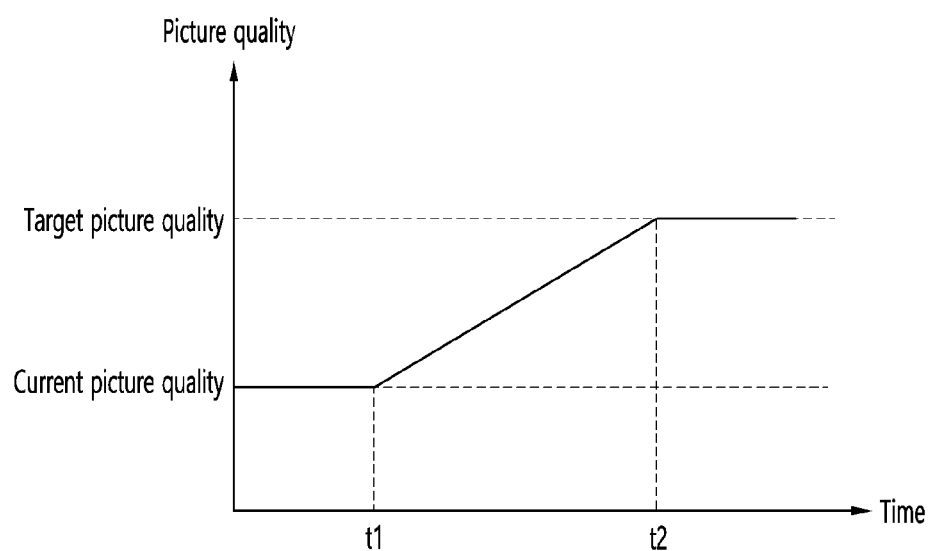
FIG. 9 is a graph illustrating a change in picture quality when a display device according to an embodiment of the present disclosure changes a picture quality.

FIG. 9 is a graph illustrating a change in picture quality when a display device according to an embodiment of the present disclosure changes a picture quality.

Referring to FIG. 9, the controller 170 may set a target picture quality at time point t1 and set a picture quality adjustment time to a time (t2−t1). The controller 170 may calculate a picture quality adjustment step based on the difference between the target picture quality and the current picture quality and the time (t2−t1).

The controller 170 may gradually change the picture quality during a period of time from time point t1 to time point t2. The controller 170 may set the picture quality such that the picture quality is changed every second by the amount corresponding to the picture quality adjustment step. Accordingly, the picture quality being displayed by the display unit 180 may be gradually changed. Accordingly, it is possible to minimize a case in which the user recognizes the change in picture quality, so that the picture quality can be changed more naturally.

Meanwhile, the controller 170 may fix the genre of the image during the picture quality adjustment time. That is, the controller 170 may not change the genre of the image during the picture quality adjustment time.

This may be to minimize an unnecessary change in picture quality. As a specific example, when the display unit 180 displays a specific program, there is a case in which a commercial is temporarily displayed in the middle of the program. In this case, the controller 170 may recognize that the genre of images has been changed while the commercial is being displayed. In this case, when the picture quality is changed based on a genre changed according to the commercial, after the commercial ends, the picture quality is changed according to the genre according to the program, thus causing a problem of continuously changing the picture quality for a short period of time. Accordingly, the controller 170 may minimize unnecessary changes in picture quality by fixing the genre of the image during the picture quality adjustment time.

Further, according to an embodiment, after acquiring the genre of images in step S11, the controller 170 may immediately set a target picture quality and change the picture quality to the target picture quality.

However, according to another embodiment, after acquiring the genre of images in step S11, the controller 170 may set the target picture quality according to the genre of images only when the acquired genre of images is maintained for a predetermined time, and change the picture quality to the target picture quality. That is, when it is recognized that the genre of images is changed from a current genre to another genre after the genre of the image is acquired, the controller 170 may control the display unit 180 to change the picture quality only when the changed genre is maintained for a predetermined time. The reason for this is to change the picture quality only when it is recognized that the user continues to watch a specific channel, since continuously changing the picture quality even when the user simply switches channels corresponds to an unnecessary change in picture quality.

The display device 100 according to an embodiment of the present disclosure may automatically change a picture quality such as contrast, brightness, color temperature, or the like based on a change in EPG, audio signal, or video signal.

As described above, according to an embodiment of the present disclosure, the controller 170 may switch an audio mode to any one of a surround mode, a TV speaker mode, a Bluetooth speaker mode, and a speaker extension mode based on the genre or channel number of images to output a suitable sound source, thereby improving the user's satisfaction.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
a storage unit configured to store picture qualities corresponding to genres of images;
a display unit configured to display an image corresponding to an input image signal; and
a controller configured to:
determine a genre of the displayed image at set time intervals during display of the displayed image, wherein at each set time interval the determining the genre comprises:
analyzing an audio signal and a video signal from the image signal and calculating a probability for each of a plurality of genres based on the analysis;
identifying a genre of the plurality of genres having a maximum calculated probability value; and
determining whether the maximum calculated probability value is greater than or equal to a threshold reference probability; and
changing a picture quality of the displayed image at the set time interval to a stored picture quality corresponding to the identified genre of the displayed image when the maximum calculated probability value is greater than or equal to the threshold reference probability, and not changing the picture quality of the displayed image at the set time interval when the maximum calculated probability value is less than the threshold reference probability,
wherein changing the picture quality comprises:
setting the stored picture quality as a target picture quality,
calculating a picture quality adjustment increment by dividing a difference value between the target picture quality and the current picture quality by a preset total adjustment time during which the picture quality of the displayed image is to be changed to the target picture quality, and
controlling the display unit to gradually change the picture quality of the displayed image, wherein each change is by a value obtained by multiplying the calculated picture quality adjustment increment and a picture quality adjustment direction variable until the target picture quality is achieved.

2. The display device of claim 1, wherein the controller is further configured to fix the genre of the image until a next set time interval.

3. The display device of claim 1, wherein the controller is further configured to:
increase the picture quality of the displayed image based on the target picture quality being higher than the current picture quality; and
decrease the picture quality of the displayed image based on the target picture quality being lower than the current picture quality.

4. The display device of claim 3, wherein the controller is further configured to:
set the picture quality adjustment direction variable to a positive value based on the target picture quality being higher than the current picture quality; and
set the picture quality adjustment direction variable to a negative value based on the target picture quality being lower than the current picture quality.

5. The display device of claim 1, wherein the picture quality is adjusted based on at least one of contrast, brightness, sharpness, color depth, or color temperature.

6. The display device of claim 1, further comprising:
a user input interface configured to receive an image mode selection command,
wherein the controller is further configured to control the display unit to change the picture quality of the displayed image according to the genre of the displayed image based on an image mode of the display device being set to an auto mode according to the image mode selection command.

7. A method for controlling a display device, the method comprising:
receiving an input image signal;
displaying an image corresponding to the input image signal;

determining a genre of the displayed image at set time intervals, wherein at each set time interval the determining the genre comprises:

analyzing an audio signal and a video signal from the image signal and calculating a probability for each of a plurality of genres based on the analysis;

identifying a genre of the plurality of genres having a maximum calculated probability value; and determining whether the maximum calculated probability value is greater than or equal to a threshold reference probability;

changing a picture quality of the displayed image at the set time interval based on a stored picture quality corresponding to the identified genre of the displayed image when the maximum calculated probability value is greater than or equal to the threshold reference probability, and not changing the picture quality of the displayed image at the set time interval when the maximum calculated probability value is less than the threshold reference probability, wherein changing the picture quality comprises:

setting the stored picture quality as a target picture quality, calculating a picture quality adjustment increment by dividing a difference value between the target picture quality and the current picture quality by a preset total adjustment time during which the picture quality of the displayed image is to be changed to the target picture quality, and gradually changing the picture quality of the displayed image, wherein each change is by a value obtained by multiplying the calculated picture quality adjustment increment and a picture quality adjustment direction variable until the target picture quality is achieved.

* * * * *